United States Patent [19]

Allport

[11] 4,037,104

[45] July 19, 1977

[54] DUAL BEAM X-RAY THICKNESS GAUGE

[75] Inventor: John J. Allport, Santa Clara, Calif.

[73] Assignee: Nucleonic Data Systems, Inc., Irvine, Calif.

[21] Appl. No.: 681,571

[22] Filed: Apr. 29, 1976

[51] Int. Cl.² .......................................... G01M 23/00
[52] U.S. Cl. ..................................... 250/359; 250/308
[58] Field of Search ................................. 250/359, 308

[56] References Cited

U.S. PATENT DOCUMENTS

| 2,653,247 | 9/1953 | Lundahl | 250/359 |
| 3,529,151 | 9/1970 | Carr-Brion | 250/359 |
| 3,889,121 | 6/1975 | Bossen | 250/359 |

Primary Examiner—Harold A. Dixon
Attorney, Agent, or Firm—Harris, Kern, Wallen & Tinsley

[57] ABSTRACT

Apparatus and method for continuous measurement of thickness of a sheet at a rolling mill or the like without contacting the sheet. A system directing radiation through the sheet in two energy bands and providing a measure of change in composition of the material as it passes the thickness gauging station. A system providing for changing the absorption coefficient of the material in the thickness measurement as a function of the change in composition so that the measured thickness is substantially independent of variations in composition.

5 Claims, 2 Drawing Figures

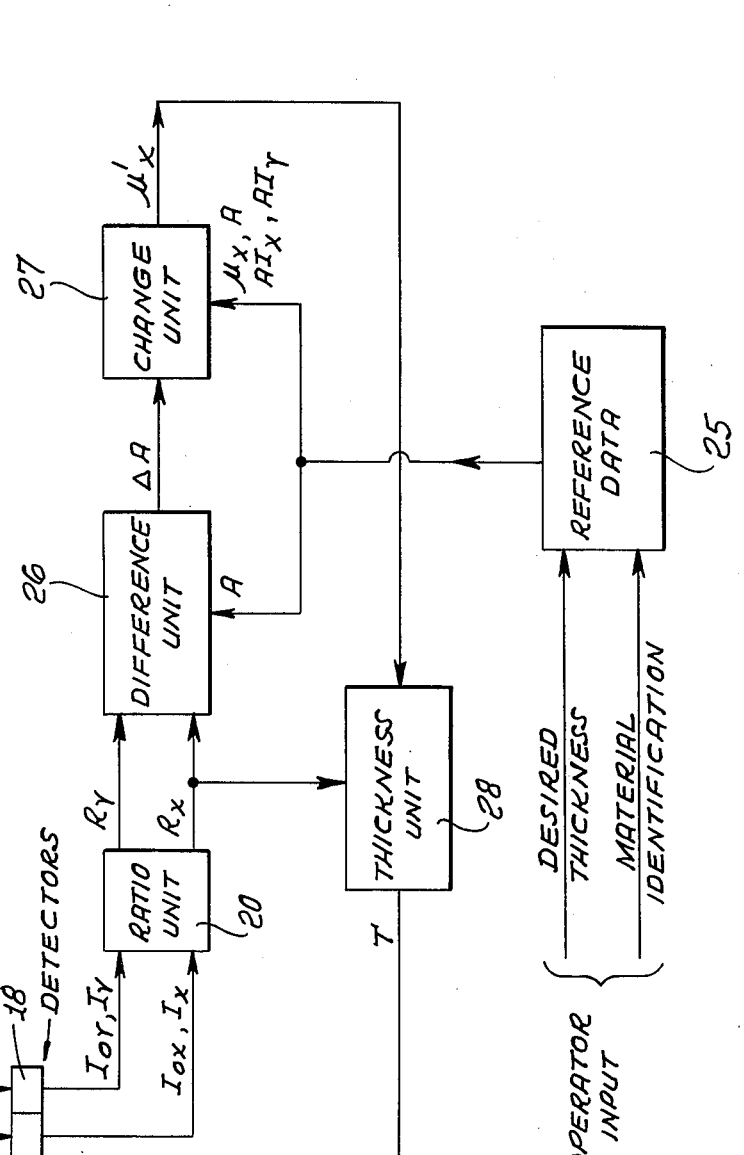

DUAL BEAM X-RAY THICKNESS GAUGE

BACKGROUND OF THE INVENTION

This invention relates to the use of X-ray or Gamma-ray radiation in the measurement of sheet thickness in ferrous and nonferrous metals. The invention is particularly suitable for use in rolling mills where relatively thin sheet material moves at relatively high speeds and it is desired to provide a continuous measurement of the thickness without contacting the sheet.

Radiation transmission system have been in use for many years for measuring sheet thickness. A typical system includes a radiation source and a radiation detector positioned on opposite sides of the sheet, with the thickness being a function of the material absorption coefficient of the material at the energy band of the source and the intensity of radiation at the detector. The prior art systems have been reasonable accurate when the composition of the material is known. However if the material composition differs substantially from the nominal or standard composition, measurement errors in the range of one percent to ten percent occur. This is a particular problem when the sheet is rolled from a continuously cast ingot, since, during change from one nominal alloy to another, the composition of the ingot will vary considerably from either of the nominals.

Beta gauges have been used in some sheet and foil mills. Unfortunately, however, sensitivity to oil film, oil drops, air density and gauge misalignment have made the Beta gauges unsatisfactory in rolling operations for thickness measurement.

U.S. Pat. No. 3,121,166 discloses the alternate use of two X-ray sources in measuriing paper web density and can filling. In one embodiment, two different radiations are alternately directed through the paper web, with one radiation transmission providing a measure of the quantity of water and the other providing a measure of the quantity of pulp in the web. Another embodiment uses the alternating source directed through a can with alternating detector outputs coupled into a gain control or nonlinear networks which compensate for the thickness of the can lids, with the output indicating the quantity of material in the can.

These various prior art devices have not been satisfactory for the measurement of thickness of a sheet in a rolling mill with the desired accuracy of ±0.25% where the composition of the sheet changes. By way of example, in an aluminum alloy containing copper or zinc a change in the amount of copper or zinc in the order of ±0.5% often occurs. Using the conventional equation for calculating thickness as a function of radiation transmission and material absorption coefficient, errors in measured thickness in the order of ±5% will occur.

Accordingly, it is an object of the present invention to provide a new and improved method and apparatus for continuous measurement of sheet thickness without requiring contact with the sheet and with the measurement substantially independent of changes in material composition.

SUMMARY OF THE INVENTION

The present invention measures the sheet transmission at two energy bands, such as two X-ray energies or two Gamma-ray energies or a Gamma-ray and an X-ray energy. The two energies are transmitted through the sheet at the same time so that the actual thickness of the sheet is canceled from the relative measurement. The thickness of the sheet is calculated in the conventional manner using the transmission in one of the energy bands. However rather than utilizing the nominal absorption coefficient for the material, a corrected or compensated absorption coefficient is utilized. The shift in relative transmission of the two bands compared with the relative two-band transmission for the standard or nominal composition of the alloy is used to provide a correction for the absorption coefficient. The dual energy system provides a rapid and continuous correction for composition change.

The system utilizes sources and detectors for transmitting radiation through the material in two energy bands and for detecting the transmitted radiation and providing sheet transmission ratios for each energy band. The system further utilizes a reference data source providing nominal data for the system based on the desired sheet thickness and the identificatiion of the material being measured. Means are provided for detemining the difference between the nominal and the measured absorption coefficient ratios using the reference data and the actual transmission data. This difference results from the variation in composition of the material from the nominal as it passes the measuring station and is used to compensate the nominal sheet absorption coefficient to correct for the change in composition. The system finally provides for calculation of the actual thickness utilizing the compensated coefficient, with the actual thickness being available for indication and manual or automatic control of the roll stand.

BRIEF DESCRIPTION OF THE DRAWING

FIG. 1 is a block diagram illustrating a thickness measuring system incorporating the presently preferred embodiment of the invention; and FIG. 2 is a diagram of an alternative arrangement for the radiation source and detectors.

DESCRIPTION OF THE PREFERRED EMBODIMENT

In the conventional single beam or single energy band radiation thickness gauge, a change in composition of the material changes the radiation absorption, which to the instrument appears as a change in thickness. The present invention provides a correction for this source of error by detecting that a change in composition has taken place and properly compensating the instrument for the change. The system of the invention detects the composition change as a change in the ratio of the absorption coefficients at the two energies, and then compensates the thickness measurement as made singly at either of the two energies for this composition change.

FIG. 1 of the drawing illustrates a sheet of material 10 moving past a roll stand 11 and a gauging station 12. The roll stand 11 may be conventional and may include a gap control unit 13 for varying the spacing between the rolls.

The gauging station 12 includes means for providing radiation transmission through the sheet in two energy bands. The two bands should be sufficiently separated in energy so that the transmission values will be different for different material compositions. The wider the difference between the two energy bands, the more sensitive the sytem will be. A typical system may utilize an X-ray tube providing radiation operating at 30 kv dc and a Gamma-ray source such as Americium 241 providing monoenergetic radiation at 59.6 Kev. Alternatively, two X-ray tubes operating at different energies or two Gamma-ray sources operating at different energies may be utilized. The embodiment illustrated in FIG. 1 has an X-ray source 15 with detector 16 and a Gamma-ray source 17 with detector 18. The detectors typically are ionization chambers with gas fills optimized for detection at the energies of the respective sources.

Another alternative for a source and detector is shown in FIG. 2. A single X-ray source 15' with a multi-energy spectrum is positioned on one side of the sheet 10 and stacked detectors 16', 18' are positioned on the other side. Detector 18' is made sensitive to the high energy portion of the spectrum by proper choice of fill gas and by a filter 19 positioned between the detectors. Detectors 16' is made very transmissive for the high energy portion of the spectrum and sensitive to the low energy portion of the spectrum by proper choice of fill gas.

The detectors 16, 18 or 16', 18' provide outputs to a ratio unit 20. The ratio unit provides an output $R_y$ which is the sheet transmission ratio of radiation flux in the energy band of the source 15 transmitted through the sheet 10 to the flux transmitted through air in absence of the sheet. The ratio unit 20 also provides an output BΓ which is the sheet transmission ratio for the source 17.

The radiation intensity at the detectors is measured for air transmission without the sheet 10 and these values $I_{ox}$ and $I_{o\gamma}$ are stored. When the mill is running the sheet 10, the detectors provide the radiation intensity transmitteed through the sheet as $I_x$ and $I_\gamma$ which values are used to calculate the ratios $R_x$ and $R_\gamma$, where $R_x = I_x/I_{ox}$ and $R_\gamma = I_\gamma = I_\gamma/I_{o\gamma}$.

The nominal data values for the system are stored in a reference data unit 25. The operator has previously selected a desired thickness and a desired material, the latter typically being the alloy number.

The reference data unit 25 typically may be an electronic memory which provides electrical signals as outputs suitable for computation and corresponding to the nominal values for various parameters of the identified material and desired thickness. This nominal data is provided to a difference unit 26 and to a change unit 27.

The difference unit 26 calculates the difference between the nominal and measured two-band absorption coefficient ratios for the material as the sheet passes the gauging station, using the transmission ratios from the ratio unit and the data from the reference data unit. The output of the difference unit indicated as $\Delta A$ varies as a function of the difference between the nominal composition of the material identified at the reference data unit and the actual composition of the sheet 10 at the gauging station. This output is connected as an input to the change unit 27 which calculates a sheet absorption coefficient for one of the energy bands, here the energy band of the source 15, using the nominal data from the reference data unit. The output of the change unit is the changed or compensated sheet absorption coefficient $\mu_x'$ which is connected to a thickness unit 28 which calculates the actual thickness of the sheet 10 at the gauging station 12 using the sheet transmission ratio and the sheet absorption coefficient as inputs. The outputs of the thickness unit may be coupled to an indicator 29 providing the operator with an indication of sheet thickness, and may be coupled to the gap control unit 13 for automatically varying the gap.

The ratio unit 20, the difference unit 26, the change unit 27, the reference data unit 25 and the thickness unit 28 may be separate computation units which produce the outputs indicated, or alternatively, all the units may be incorporated in a computer operating under programmed control to produce the desired output.

In operation, the system detects as shift in the X-ray absorption coefficient of the sheet 10 from the nominal absorption coefficient of the alloy for which the X-ray gauge has been calibrated. No attempt is made to determine the exact composition of sheet; this information is not required. The transmission ratio of the sheet, $R_x$, for the X-rays from source 15 may be written:

$$R_x = e^{-\mu_x T} \tag{1}$$

(See definition of symbols, page 15) where $\mu_x$ is the absorption coefficient (in$-1$) and T is the thickness in inches. Similarly, the transmisson of the sheet for Gamma-rays from source 17 may be written:

$$R_\gamma = e^{-\mu_\gamma T} \tag{2}$$

The absorption coefficients, either X-ray or $\gamma$, are due to the total scattering and absorption cross section of the sheet at either the X-ray or Gamma-ray energy:

$$\mu = \rho \sigma_T = \rho \sum_{n=1}^{m} a_n \sigma_n \tag{3}$$

The various aluminum alloys contains as many as ten to 12 different elements in minor and major concentrations. Some of the more common alloying elements such as copper and zinc have total X-ray cross sections approximately 11 times that of aluminum, and total Gamma-ray cross sections of approximately 6 times that of aluminum. Within the pouring tolerances, these elements may vary as much as ±0.5% in concentration. Clearly, from equation 3, it must be expected that this variation in concentration will cause an approximate ±5% variation in the X-ray absorption coefficient and an approximate ±3% variation in the Gamma-ray absorption coefficient. These variations in concentration will then result in ±5% error in measured thickness on average for an X-ray gauge calibrated for average or median concentrations.

Changing composition and cross section will result in a change in the ratio of the total X-ray and Gamma-ray cross sections, and therefore in the ratio of the absorption coefficients, i.e., $$\frac{\mu_x}{\mu_\gamma} = \frac{\sum_{n=1}^{m} a_n \sigma_{xn}}{\sum_{n=1}^{m} a_n \sigma_{\gamma n}} = A \tag{4}$$

and $\Delta A \neq 0$ when the composition shifts since $\sigma_{xn} \neq \sigma_{\gamma n}$, i.e., A is not a constant for the sheet being measured, and changes as the composition changes.

The principle of operation of the dual energy band gauge is to sense the shift of the measured value of A for the sheet being measured and use this information to correct $\mu_x$ to the correct $\mu_x'$. Using equation (4):

$$\frac{d\mu_x'}{\mu_x} = \frac{dA}{A} + \frac{d\mu_\gamma}{\mu_\gamma} \tag{5a}$$

-continued or $$\frac{\mu'_x - \mu_x}{\mu_x} = \frac{A' - A}{A} + \frac{\mu' - \mu_\gamma}{\mu_\gamma} \quad (5b)$$

where $\mu_x$ and $\mu_\gamma$ and A are nominal values stored in the reference data unit 25 for the particular material or alloy being run, and A' and $\mu'$ are the actual present values for the alloy in the gauge gap.

The value of A' is determined from $$A' = \frac{\mu'_x}{\mu_\gamma'} = \frac{\ln R_x}{\ln R_\gamma} \quad (6)$$

where it is evident that A is independent of thickness to the extent that $\mu_x$ and $\mu_\gamma$ are independent of thickness. Returning to equation (5a), by observing that $$\frac{d\mu_\gamma}{\mu_\gamma} = \frac{1}{\mu_\gamma} \frac{d\mu_\gamma}{d\mu_x} d\mu_x \text{ and that } \mu_\gamma = \frac{\mu_x}{A}$$

and that $\mu'_x = \mu_x + d\mu_x$
the new correct value of $\mu_x'$ is:

$$\mu'_x = \mu_x \left[ 1 + \frac{\Delta A}{A} \left( \frac{1}{1 - A\left(\frac{d\mu_\gamma}{d\mu_x}\right)} \right) \right] \quad (7)$$

For a given alloy, the quantity $d\mu_\gamma/d\mu_x$ is evaluated by noting that for small changes of elemental concentration, the average change will result in essentially the addition or subtraction of an equivalent weight of aluminum for an equivalent weight of the alloy, hence:

$$A \frac{d\mu_\gamma}{d\mu_x} = A \left( \frac{\mu_\gamma - \mu_{\gamma al}}{\mu_x - \mu_{xal}} \right) = \frac{A}{A_{al}} \left( \frac{\frac{\mu_\gamma}{\mu_{\gamma al}} - 1}{\frac{\mu_x}{\mu_{xal}} - 1} \right) \quad (8)$$

or $$A \frac{d\mu_\gamma}{d\mu_x} = \frac{A}{A_{al}} \frac{AI_\gamma}{AI_x} \quad (9)$$

where $AI_\gamma$ and $AI_x$ are the absorption indices for the alloy and $$AI_\gamma = \left( \frac{\mu_\gamma}{\mu_{\gamma al}} - 1 \right) * 100$$

$$AI_x = \left( \frac{\mu_x}{\mu_{xal}} - 1 \right) * 100$$

hence from equation (7)

$$\mu'_x = \mu_x \left[ 1 + \frac{\Delta A}{A} \left( \frac{1}{1 - \left(\frac{A}{A_{al}}\right)\left(\frac{AI_\gamma}{AI_x}\right)} \right) \right] \quad (10)$$

The absorption indices $AI_\gamma$ and $AI_x$ are a convenient way to relate the nominal X-ray and Gamma-ray transmission properties of a given alloy to those of pure aluminum. As noted earlier, the allowable within alloy concentration tolerances are wide enough to present normal X-ray and Gamma-ray sensors with a serious problem in accurately defining the respective absorption coefficients. In the present dual energy gauge, as is apparent from equation (10), all calibrations are based on a reference, such as 99.99% or purer aluminum, a well defined and available material. The within-alloy variations are automatically compensated for, on-line, by measuring the shift in the alloy A value from the nominal alloy A value stored and then applying the correction indicated in equation 10 to obtain the new and correct X-ray absorption coefficient.

Equation (10) may be written as:

$$\mu'_x = \mu_x \left( 1 + G \frac{dA}{A} \right) \quad (11)$$

where $$G = \left( 1 - \frac{A}{A_{al}} \frac{AI_\gamma}{AI_x} \right)^{-1} \quad (12)$$

Since the absorption index values are constant within a fairly broad range of X-ray energies, it follows that G is also insensitive to relatively large changes in X-ray energy. In the composition range of interest, the value of G changes by about 20% for a 30% change in X-ray absorption coefficient. Since the maximum errors to be corrected in $\mu_x$ (and T) are ±10%, the error in the correction due to a shift in G is 20/30 × 10% × 10% or 0.67%. At the pure aluminum end of the range, the corrections to $\mu_x$ are in the order of 1%, and even a 20% error in G leads to only a 0.2% thickness error.

The system described provides for use of the correct primary X- and Gamma-ray absorption coefficients for the alloy selected and for the precise sheet thickness range. In covering a thickness range from 0.005 inch to 0.300 inch, it happens that the effective X-ray absorption coefficient changes by 10% to 20%, depending on the alloy. This is a normal effect, and is caused by progressive hardening of the X-ray beam as it passes through thicker materials. Because of this, conventional X-ray gauges required standard magazines so that the gauge thickness set point and deviation may be set by controlled insertion of standards near the sheet target thickness. In the system of the present application, the absorption coefficient is provided as a function of thickness in the memory of the reference data unit. When the operator enters the alloy identification and desired thickness, the correct absorption coefficient for that nominal alloy and precise thickness is computed. As described earlier, the shift in absorption coefficient for off-nominal composition is then corrected by on-line measurement throughout the running of the sheet.

At the start of a run, the operator sets the material nominal identification and the desired thickness in the reference data unit, which provides the nominal parameters A, $\mu_x$, $AI_x$ and $AI_\gamma$, using previously stored calibration data. A and $\mu_x$ may be calculated for the specific thickness.

Before the sheet is threaded through the gauging gap, $I_{ox}$ and $I_{o\gamma}$ are determined and stored. After the mill is running $I_x$ and $I_\gamma$ are determined and the difference $\Delta A$ is computed, where $\Delta A = A' - A$, and $$A' = lnR_x/\ln R_x = \ln\frac{I_x}{I_{ox}} / \ln\frac{I_\gamma}{I_{o\gamma}}.$$

Then the changed coefficient $\mu_x'$ is determined using equation (10). Finally the thickness is calculated using the conventional relation $T = 1/\mu_x'$ $\ln R_x$.

If desired, greater accuracy may be achieved by monitoring the X-ray tube beam current and the X-ray tube target voltage and introduciing compensation factors in the calculations for changes or drifts in the quantity during the operation. Also, the air temperature of the gauge window air wipes and the measurement gap may be measured both during standardization or calibration and on-sheet operation, with the calculations being compensated for changes or drifts in these quantities.

Although an exemplary embodiment of the invention has been disclosed and discussed, it will be understood that other applications of the invention are possible and that the embodiment disclosed may be subjected to various changes, modification, and substitutions without necessarily departing from the spirit of the invention. By way of example, the invention should not be limited to the specific energy bands or radiation sources disclosed. The thickness ranges, accuracy and the like, are given for illustrative purposes and are not intended to limit the scope of the invention.

DEFINITION OF SYMBOLS $R_X$: Sheet transmission for X-rays (non-dimensional), ratio of flux transmitted through sheet to flux transmitted through air in absence of sheet.

$\mu_x$: Sheet absorption coefficient for X-rays (in$^{-1}$) for nominal alloy.

T : Sheet thickness (inches).

$R_\gamma$ : Sheet transmission for gamma-rays (non-dimensional).

$\mu_\gamma$ : Sheet absorption coefficient for gamma-rays for nominal alloy.

$\rho$ : Density.

$a_n$: Element weight concentration (percentage weight concentration/100).

$\sigma_n$: Element total cross section at the energy of interest.

A : $\mu_x/\mu_\gamma$, alloy absorption coefficient ratio for nominal alloy.

$\mu_{\gamma al}$ : Sheet absorption coefficient for gamma-rays, pure aluminum.

$\mu_{xal}$ : Sheet absorption coefficient for X-rays, pure aluminum.

$AI_\gamma$ : Alloy absorption index for gamma-rays.

$AI_x$ : Alloy absorption index for X-rays.

G : Defined in Equation (12).

I claim:

1. In a system for continuously measuring the thickness of a strip of sheet metal while the composition of the material changes as it moves past a gauging station, the combination of:
   source means for generating radiation in first and second energy bands;
   detector means positioned for receiving radiation from said source means in each of said bands with the sheet to be measured positionable therebetween, providing as outputs data for a first sheet transmission ratio of radiation flux in the first band transmitted through the sheet to flux transmitted through the air in absence of the sheet, and a second sheet transmission ratio of radiation flux in the second band transmitted through the sheet to flux transmitted through air in absence of the sheet;
   reference means having as inputs the desired thickness and identification of the material of the sheet to be measured and providing as an output radiation absorption data in each of said energy bands for the nominal composition of the material;
   first means for determining as an output the difference between the nominal and measured composition absorption coefficient ratios of the material as the sheet moves between said source and detector means;
   means for connecting the outputs of said detector and reference means to said first means as inputs;
   second means for calculating the thickness of the sheet as a function of the sheet transmission ratio and sheet absorption coefficient in said first energy band;
   means for connecting the output of said detector means and the sheet absorption coefficient for said first energy band to said second means as inputs;
   third means for changing the value of the sheet absorption coefficient for said first energy band as a function of the ratio difference determined by said first means; and
   means for connecting the outputs of said reference and first means to said third means as inputs.

2. In a system for continuously measuring the thickness of a strip of sheet metal while the composition of the material changes as it moves past a gauging station, the combination of:
   source means for generating radiation in first and second energy bands;
   detector means positioned for receiving radiation from said source means in each of said bands with the sheet to be measured positionable therebetween, providing as outputs data for a first sheet transmission ratio $R_1$ of radiation flux in the first band transmitted through the sheet to flux transmitted through the air in absence of the sheet, and a second sheet transmission ratio $R_2$ of radiation flux in the second band transmitted through the sheet to flux transmitted through air in absence of the sheet;
   reference means having as inputs the desired thickness and identification of the material of the sheet to be measured and providing as an output the sheet absorption coefficient $\mu$, and the material absorption index $AI_1$ for the first band, the material absorption index $AI_2$ for the second band, and the material absorption coefficient ratio A, all for the nominal composition of the identified material, and the material absorption coefficient ratio $A_{ref}$ for a reference material, where $A = \mu_1/\mu_2 = \ln R_1/\ln R_2$;
   first means for determining as an output the difference $\Delta A$ between the nominal and measured composition absorption coefficient ratios A and A', respectively, of the material as the sheet moves between said source and detector means;

means for connecting the outputs of said detector and reference means to said first means as inputs;

second means for calculating the thickness T of the sheet as $T = -1/\mu_1 \ln R_1$;

means for connecting the output of said detector means and the sheet absorption coefficient for said first energy band to said second means as inputs;

third means for calculating the value of the sheet absorption coefficient $\mu_1'$ as $$\mu_1' = \mu_1 \left[ 1 + \frac{\Delta A}{A} \left( \frac{1}{1 - \left(\frac{A}{A_{ref}}\right)\left(\frac{AI_2}{AI_1}\right)} \right) \right]; \text{ and}$$

means for connecting the outputs of said reference and first means to said third means as inputs.

3. In a system for continuously measuring the thickness of a strip of sheet metal while the composition of the material changes as it moves past a gauging station, the combination of:

source means for generating radiation in first and second energy bands;

detector means positioned for receiving radiation from said source means in each of said bands with the sheet to be measured positionable therebetween, providing as outputs data for a first sheet transmission ratio of radiation flux in the first band transmitted through the sheet to flux transmitted through the air in absence of the sheet, and a second sheet transmission ratio of radiation flux in the second band transmitted through the sheet to flux transmitted through air in absence of the sheet;

difference means for determining as an output the difference between the nominal and measured composition absorption coefficient ratios of the material as the sheet moves between said source and detector means;

means for connecting the output of said detector means and a signal representing said nomimal absorption coefficient ratio to said difference means as inputs;

compensation means for changing the value of the sheet absorption coefficient for said first energy band from the nominal value for the nominal composition of the material as a function of the ratio difference determined by said difference means;

means for connecting the output of said difference means and signals representing the nominal values for the material to said compensation means as inputs;

thickness means for calculating the thickness of the sheet as a function of said sheet transmission ratio and said changed sheet absorption coefficient in said first energy band; and means for connecting the output of said detector means and said changed sheet absorption coefficient for said first energy band to said thickness means as inputs.

4. A method for continuously measuring the thickness of a strip of sheet metal while the composition of the material changes as it moves past a gauging station, including the steps of:

directing radiation throught the sheet in first and second energy bands;

producing a first sheet transmission ratio of radiation flux in the first band transmitted through the sheet to flux transmitted through the air in absence of the sheet, and a second sheet transmission ratio of radiation flux in the second band transmitted through the sheet to flux transmitted through air in absence of the sheet;

calculating the difference between the nominal and measured composition absorption coefficient ratios of the material as the sheet moves past the gauging station;

changing the value of the sheet absorption coefficient of the material for the first energy band as a function of the absorption coefficient ratio difference; and calculating the thickness of the sheet as a function of the sheet transmission ratio and sheet absorption coefficient in said first energy band using the changed value of the sheet absorption coefficient.

5. A method for continuously measuring the thickness of a strip of sheet metal while the composition of the material changes as it moves past a gauging station, including the steps of:

directing radiation through the sheet in first and second energy bands;

producing a first sheet transmission ratio $R_1$ of radiation flux in the first band transmitted through the sheet to flux transmitted through the air in absence of the sheet, and a second sheet transmission ratio $R_2$ of radiation flux in the second band transmitted through the sheet to flux transmitted through air in absence of the sheet;

calculating the difference between the nominal and measured composition absorption coefficient ratios of the material as the sheet moves past the gauging station, where the composition absorption coefficient ratio is $\mu_1/\mu_2 = \ln R_1/\ln R_2$;

changing the value of the sheet absorption coefficient of the material for said first energy band $\mu_1'$ as a function of the ratio difference; and calculating the thickness of the sheet as a function of the sheet transmission ratio and the changed sheet absorption coefficient in said first energy band, where the thickness is $-1/\mu_1', \ln R_1$.

* * * * *